Feb. 25, 1964    M. H. MacKUSICK ETAL    3,122,245
BOAT TRAILER
Filed Jan. 3, 1961    4 Sheets-Sheet 1
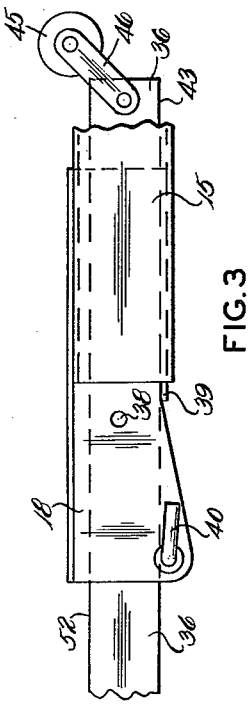
FIG.3
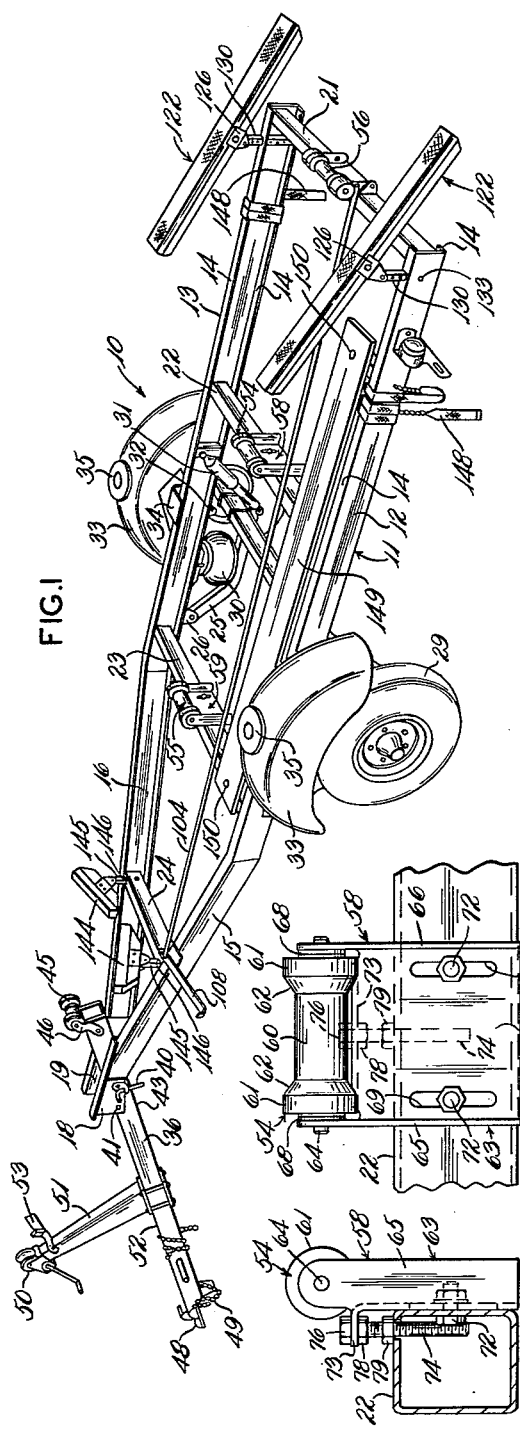
FIG.1
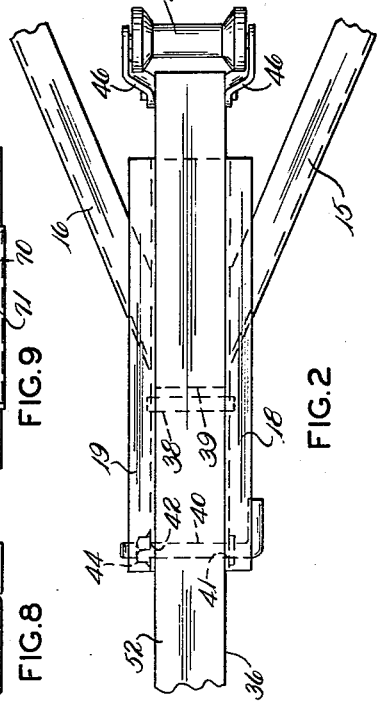
FIG.9
FIG.2
FIG.8

Feb. 25, 1964   M. H. MacKUSICK ETAL   3,122,245
BOAT TRAILER
Filed Jan. 3, 1961   4 Sheets-Sheet 4
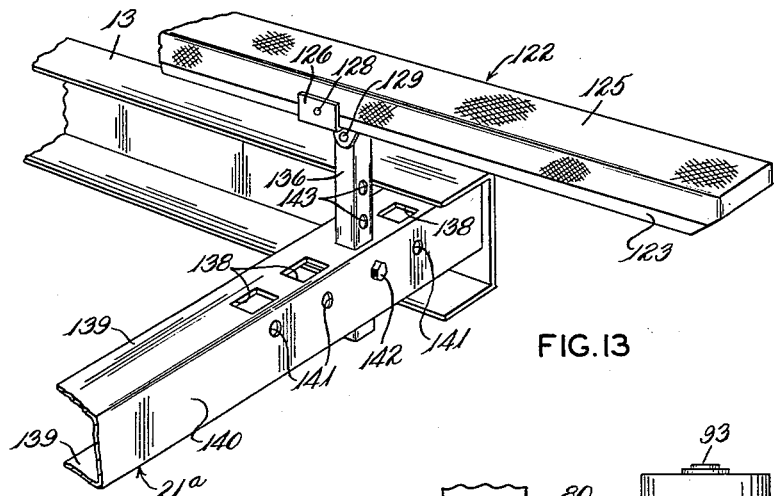
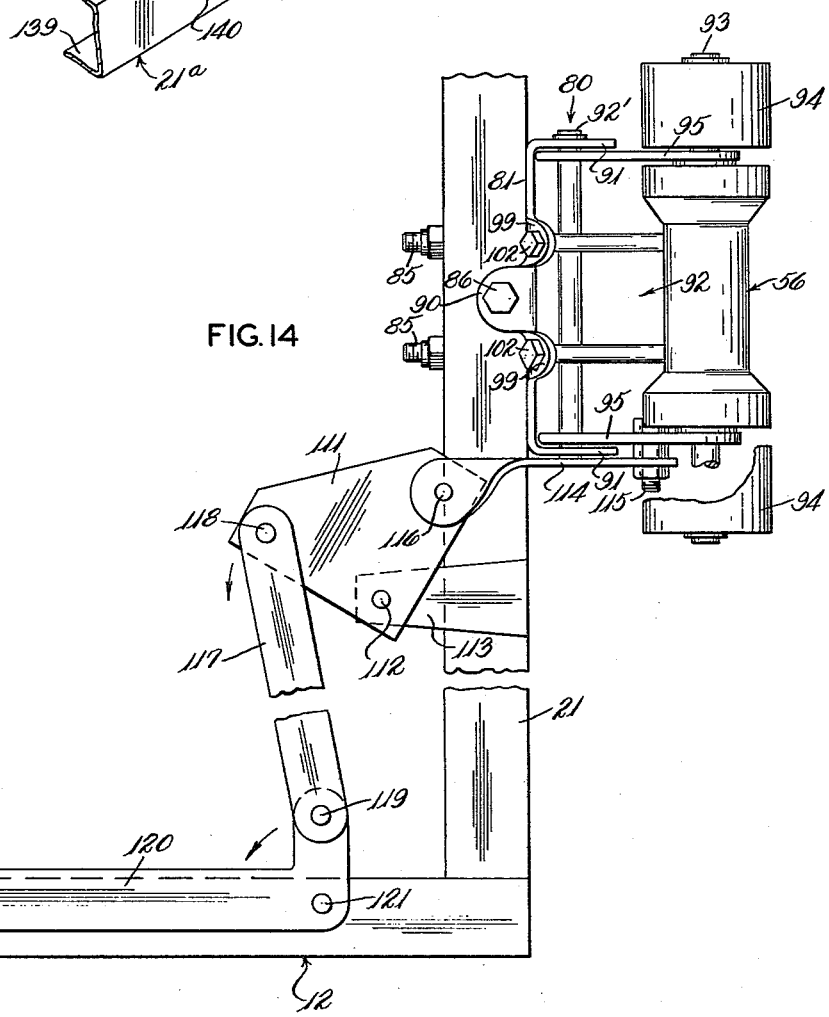

3,122,245
BOAT TRAILER
Meredith H. MacKusick, Akron, Ohio, and Daniel W. Voorhees, Quincy, Ill., assignors to The Firestone Tire & Rubber Company, Akron, Ohio, a corporation of Ohio
Filed Jan. 3, 1961, Ser. No. 80,195
7 Claims. (Cl. 214—84)

The present invention relates to boat trailers and more particularly to trailers having improved means for loading, transporting and unloading a boat.

The modern boating enthusiast may wish to enjoy the waters of various lakes and rivers which are not navigably connected, or he may wish to store his boat at his residence so as not to incur a docking fee. However, the hull of a boat is especially constructed to be supported by water, so in either event when a boat is not afloat every care must be exercised to protect the hull from damage by improper weight distributing support. Similar care must also attend the loading and unloading of the boat, and at the same time it is desirable to accomplish these operations by the exertion of a minimum amount of physical effort.

It is, therefore, the primary object of the present invention to provide an improved trailer construction which perfects the utmost in protection for a boat supported thereon and the utmost in loading and unloading ease.

This and other objects which will become apparent from the following specification are accomplished by means hereinafter desecribed and claimed.

The achievement of the foregoing objects entails the provision of a trailer which embodies certain details in the construction of the combined structural elements as are fully brought to light by the following detailed description of the preferred embodiment shown by way of example in the accompanying drawings. This detailed description, however, does not attempt to show all the various forms and modifications in which the invention might be embodied; the invention being measured by the appended claims and not by the details of the specification.

Referring to the drawings:

FIG. 1 is a perspective view of a boat trailer according to the present invention in the unload position;

FIG. 2 is a fragmentary top plan view of the tipper boom member of the trailer;

FIG. 3 is a side elevation of the FIG. 2 representation;

FIG. 4 is a fragmentary longitudinal sectional view of the tipper boom showing the boom tipped;

FIG. 5 is a fragmentary top plan view of the elevating keel roller assembly;

FIG. 6 is a side elevation of the FIG. 5 representation;

FIG. 7 is an end elevation taken on line 7—7 of FIG. 6;

FIGS. 8 and 9 are side and end elevations respectively, of one of the intermediate keel support rollers of the boat trailer;

FIG. 13 is a perspective view of an alternative arrangement whereby the cradle pad is selectively mounted in the rear cross rail; and, FIG. 14 is a top plan view of an alternative actuating mechanism for operating the elevating keel roller assembly at the rear of the trailer.

Figure 9:
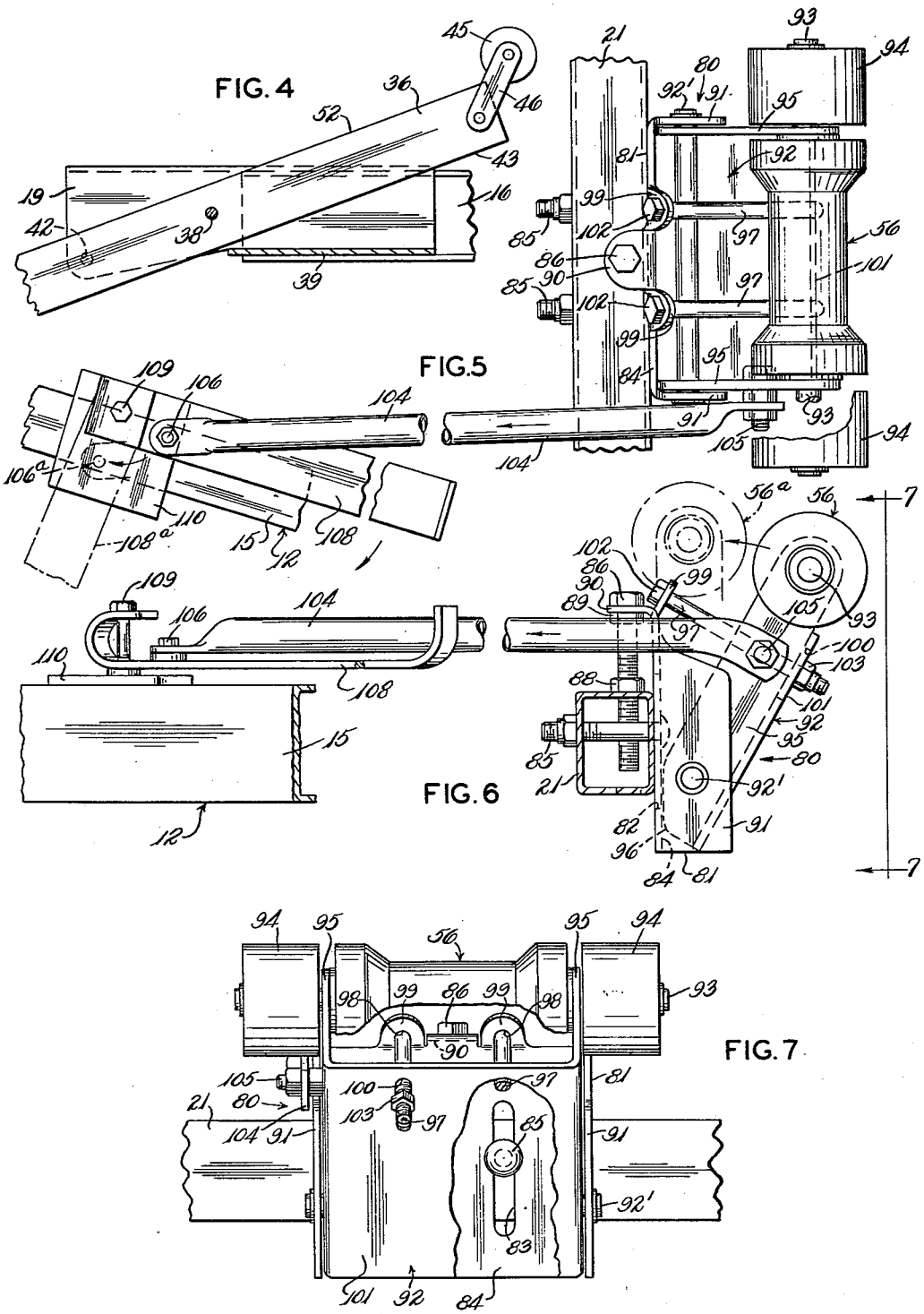

Referring now to FIG. 1, the boat trailer, designated generally by the numeral 10, comprises a welded A-frame assembly 11 preferably formed of opposed longitudinal disposed channel members 12 and 13 having inwardly extending legs 14.

The front portion 15 and 16 of each of the longitudinal frame members 12 and 13 converge in a generally V-shaped manner, terminating in opposed spaced apart hinge plates 18 and 19, respectively, which are preferably welded to the ends thereof.

A plurality of transversely disposed box-shaped lateral stiffening members are preferably welded between the legs 14 of each longitudinal frame member 12 and 13 to define the A-frame assembly 11. The rearmost of these lateral stiffening members, or rear cross rail 21, is secured in proximity to the rearmost ends of longitudinal frame members 12 and 13. Two intermediate stiffening members or cross rails 22 and 23 are disposed at intervals, transversely of the parallel portions of members 12 and 13 and the fourth cross rail 24 is securely transversely of the longitudinal axis of trailer 10 between the converging front portions 15 and 16 of members 12 and 13.

Figure 10:
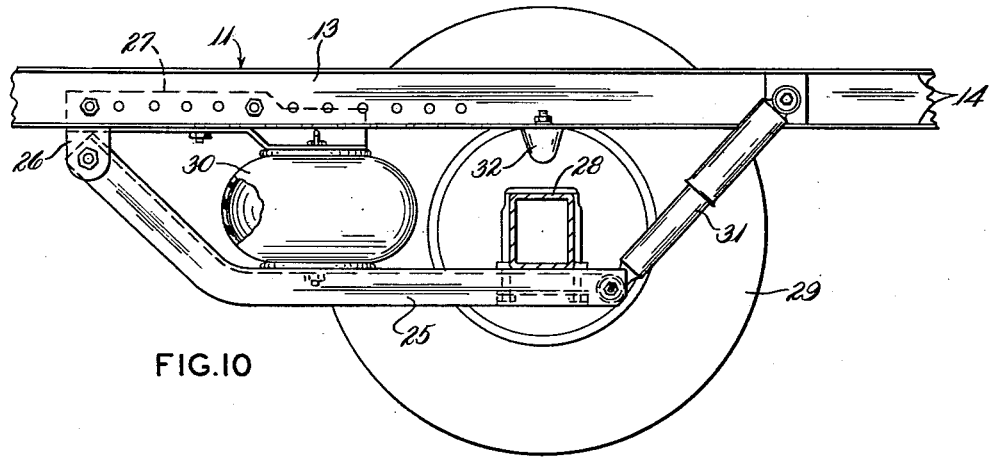
FIG. 10 is a fragmentary longitudinal sectional view through the trailer showing the air spring suspension assembly in elevation and partly broken away.

The running gear assembly, as best shown in FIG. 10, comprises a pair of pivotable suspension arms 25 trailingly depending from bracket ears 26 which extend downwardly from angle brackets 27 bolted beneath each frame member 12 and 13. Nylon bearings (not shown) are preferably provided at the pivot point for quiet and long-lived suspension. Each of the longitudinal frame members 12 and 13 are preferably drilled at intervals to allow selective longitudinal positioning of the axle in order to assure the best load balance for the boat to be transported. An axle 28 is secured to the two suspension arms 25 and wheels 29, equipped with conventional pneumatic tires, are journaled on the outer ends of axle 28 in a suitable and well known manner.

Air spring bellows 30 are interpositioned between each suspension arm 25 and its overlying longitudinal frame member 12 or 13 to provide a cushioning means between the running gear and the frame. The air spring bellows 30 are preferably of the type disclosed in either the U.S. patents to Smith (No. 2,874,458), Deist and Hollis (No. 2,929,103) or Hollis (No. 2,929,435). As disclosed in these patents the inflated pressure of the bellows 30 is varied to provide a preselected constant distance between the axle 28 and its corresponding frame member 12 or 13 in accordance with the load on the trailer. Conventional shock absorbers 31 are preferably connected between the trailing end of suspension arm 25 and its corresponding frame member 12 or 13 to assist in damping the road shock imparted to the wheels 29. Rubber bumpers 32 are provided beneath the longitudinal frame members to prevent metal to metal contact between the running gear and the frame even under the most severe operating conditions.

The fender 33 for each wheel 29 is attached to frame 11 by a fender bracket 34 secured to each longitudinal frame member 12 and 13. Each fender 33 is reinforced by means not shown so that the weight of a person standing on step plate 35 will be supported.

Referring to FIGS. 1–3, a preferably box-like tipper boom 36 is rotatably mounted between hinge plates 18 and 19 on hinge pin 38. As viewed in FIG. 3, clockwise rotation of boom 36 is limited by a fixed stop plate 39 secured between the lower portion of hinge plates 18 and 19. Stop plate 39 and hinge pin 38 are positioned to cooperatively effect the positioning of tipper boom 36 coplanar with frame 11 when the under portion of boom 36 contacts stop plate 39. Also as viewed in FIG. 3, counterclockwise rotation from the transport position depicted therein is selectively prevented by a lock pin 40 removably inserted in registering bores 41 and 42 in hinge plates 18 and 19, respectively. Bores 41 and 42 are located such that when the pin 40 is inserted therethrough it will abut the lower face 43 of boom 36. A nut 44, or some other suitable securing means is provided to prevent inadvertent dislodging of pin 40 from bores 41 and 42.

The tipper boom 36 extends rearwardly of hinge pin 38 and stop plate 39 into the area within the trailer frame 11 between converging portions 15 and 16 of longitudinal frame members 12 and 13. A pickup roller 45 is rotatably mounted between support brackets 46 extending rearwardly and upwardly from the rear end of boom 36. The function of boom 36 and appended elements, such as the pickup roller 45, will be more fully hereinafter explained.

A coupler assembly 48, or other suitable hitching means by which the trailer may be fastened to the towing vehicle is attached to the forward end of boom 36. A safety chain 49 is similarly attached to boom 36 to be used in conjunction with coupler 48.

A winch 50 is mounted on support stand or stanchion 51 which in turn is fixed to the upper side 52 of tipping boom 36, intermediate the ends thereof. Stanchion 51 is of sufficient height that winch 50 can be efficiently employed to draw a boat onto the trailer. By drawing the boat firmly against bow support pad 53 and locking winch 50 the boat is secured against further longitudinal movement fore or aft to facilitate transportation. The tipping boom 36 must be in transport position (FIG. 3) to effect proper positioning of the boat on the trailer.

To facilitate loading the boat with the winch 50 a series of keel rollers 54, 55 and 56 are positioned along the longitudinal axis of frame 11. Keel rollers 54 and 55 are journaled in gudgeons 58 and 59 attached to cross rails 22 and 23, respectively, and are preferably of a spool-like configuration. As more clearly shown in FIGS. 8 and 9, the central portion 60 and the end portions 61 of roller 54 are cylindrical but the diameter of the central portion 60 is substantially smaller than the diameter of the end portions 61. The width of the central portion 60 is sufficient to accommodate a boat keel and is connected to the end portions 61 by divergently outward tapering surfaces 62. Rollers 45, 55 and 56 are preferably of similar construction.

The gudgeons 58 and 59 are preferably of similar construction and, as shown in FIGS. 8 and 9, gudgeon 58 is preferably constructed in a channel-like configuration with roller 54 journaled on a pin 64 mounted between legs 65 and 66. Frictional resistance against the ends of roller 54 is minimized by inserting washers 68 between the legs 65 and 66 of bracket 63 and the ends of roller 54. Elongated mounting holes 69 and 70 are provided in the web 71 of bracket 63 to receive mounting bolts 72 extending through cross rail 22 in order to provide selective adjustment of the roller 54 to the desired height above cross rail 22. To permit accomplishing this adjustability with micrometer-like precision a transverse lip 73 extends outwardly from the upper portion of web 71 in a direction opposite to that of legs 65 and 66 and is positioned above cross rail 22. Lip 73 is bored to receive a threaded lock bolt 74 which extends slidably into a registering bore 75 in cross rail 22. The lip 73 is locked between head 76 and jam nut 78 to prevent vertical movement of the bracket 63 relative to lock bolt 74. Jam nut 79 is tightened against cross rail 22 to prevent vertical movement of the bolt 74 relative to cross rail 22. The vertical position of bracket 63 is thereby locked with respect to cross rail 22. It is apparent that the vertical disposition of the rollers 54–56 so mounted can thereby be precisely selected and securely locked.

Gudgeon assembly 80 on which roller 56 is journaled and which is best seen in FIGS. 5–7 similarly includes a channel-shaped mounting bracket 81 provided with elongated bores 82 and 83 in web 84 through each of which a mounting bolt 85 is positioned to secure the gudgeon assembly 80 to the rear cross rail 21. An adjusting and locking bolt 86 with jam nuts 88 and 89 selectively positioned thereon in abutment with cross rail 21 and lip 90 extending horizontally outwardly from web 84 in a direction oppositely from legs 91, respectively, serve to lock the vertical position of bracket 81 with respect to cross rail 21.

The roller 56 is rotatably mounted on an arcuately swingable gudgeon 92 pivoted on a pin 93 extending between legs 91 of bracket 81. A cylindrical roller 94 is journaled on the extension of pin 93 outwardly from each leg 91 to serve as a bumper to protect the hull of a boat and to give a greater overall rear roller assembly width to assist in centering the boat on the trailer during the initial boat-to-trailer contact during the loading operation. Gudgeon 92 is preferably of a channel-shaped configuration disposed in opposition to bracket 81 and of such a dimension that legs 95 of gudgeon 92 position between the legs 91 of bracket 81 to receive pivot pin 92' therethrough. The arcuate surfaces 96 on the lower corners of legs 95 of gudgeon 92 permit rotation of gudgeon 92 on pin 92', as controlled by means more fully hereinafter described.

As viewed in FIG. 6, counterclockwise rotation of gudgeon 92 is limited by legs 95 abutting against web 84 of bracket 81, thereby positioning roller 56 in position 56a. Clockwise rotation of gudgeon 92 is restricted by adjustable stop bolts 97 inserted through a bore 98 in each lip 99 which extends divergently upwardly of web 84 of bracket 81. Each bolt 97 also extends through a loose fitting bore 100 in the web 101 of gudgeon 92. The head 102 of each bolt 97 abuts lip 99 and the nut 103 on each bolt 97 abuts web 101 to provide an adjustable stop for limited clockwise rotation.

Rotation of gudgeon 92 is controlled by a tierod 104 pivotally attached to one leg 95 of gudgeon 92, as by double nutted bolt 105. The rod 104 extends generally longitudinally of trailer 10 and pivotally connects, as by bolt 106, to a rotatable handle 108 eccentrically of the shoulder bolt 109 on which handle 108 rotates. A plate 110 is provided on the converging front portion 15 of longitudinal frame member 12 into which shoulder bolt 109 is threaded. The eccentricity of the pivotal connection of tie rod 104 on handle 108 to the center of rotation of handle 108 effects a substantial longitudinal displacement of the rod 104 in response to rotation of handle 108. As shown in FIG. 5, clockwise rotation of handle 108 to position 108a displaces bolt 106 to position 106a, translating the tie rod 104 to the left, as shown by the arrows, and rotating gudgeon 92 to position 92a, as shown in FIG. 6. A locking means (not shown) is preferably provided to maintain the handle 108 in selected positions.

An alternative form of linkage arrangement to effect selected rotation of gudgeon 92 is shown in FIG. 14. In this embodiment rotation of gudgeon 92 can be effected when the operator is positioned at the side of the trailer near the rear end thereof, whereas in the preferred embodiment rotation of gudgeon 92 is effected when the operator is positioned near the front of the trailer. In the FIG. 14 embodiment the fulcrum of a bell crank 111 is pivoted on pin 112 attached to plate 113 fixed to rear cross rail 21. One end of a link 114 pivotally connects to one leg 95 of gudgeon 92, as by double nutted bolt 115; the other end of link 114 is pivotally secured to an effective lever arm position on bell crank 111, as by pin 116.

One end of a second link bar 117 is pivotally attached to another effective lever arm position on bell crank 111, as by pin 118. The other end of link bar 118 is pivotally attached as by pin 119, to handle 120 which is also of a bell crank-like configuration and is rotatable about a pin 121 secured to longitudinal frame member 12. Counterclockwise rotation of handle 120 effects, through link bar 118, a counterclockwise rotation of bell crank 111 which in turn rotates gudgeon 92 through a plane perpendicular to the plane of bell crank 111 to the 56a position indicated in FIG. 6.

Figures 11, 12:
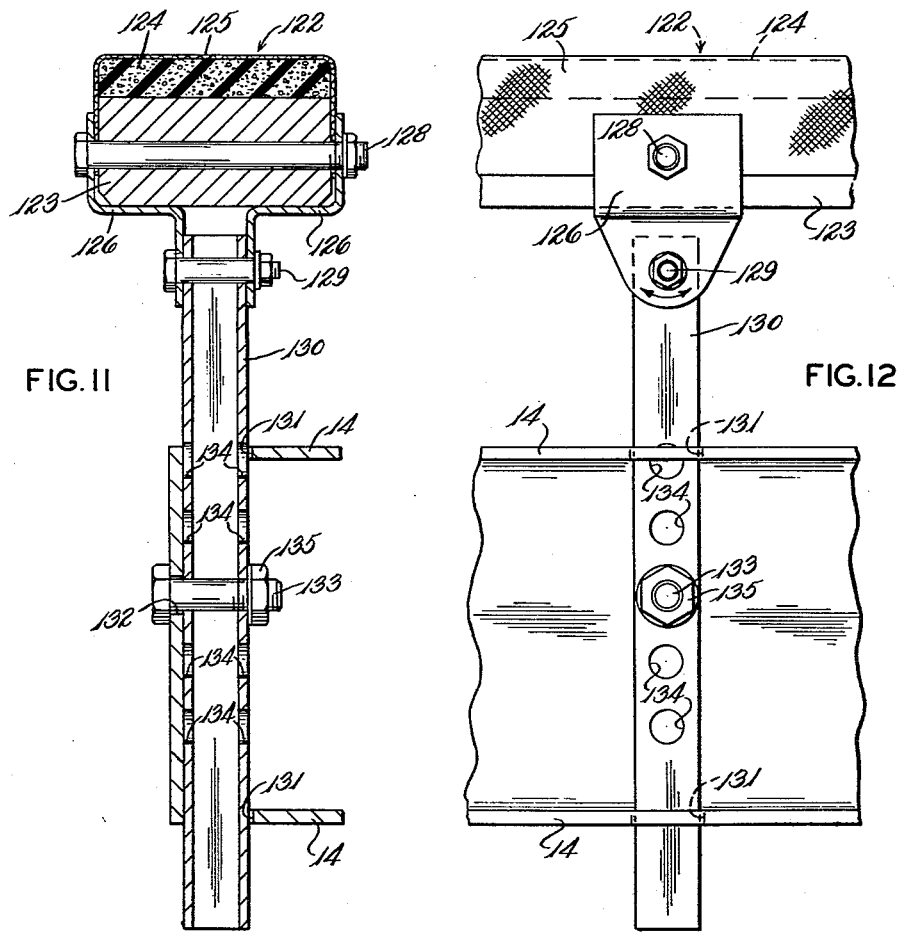
FIGS. 11 and 12 are sectional and side views, respectively, showing the cradle pads of the boat trailer.

As shown in FIG. 1, longitudinally disposed tiltable cradles or bunk pads 122 are disposed one parallel to and on either side of the longitudinal axis of trailer 10. As best shown in FIGS. 11 and 12 each pad 122 is constructed of a sturdy frame member 123 the upper surface of which is covered with and has attached thereto a layer of suitable resilient padding material 124, such as rubber, which is not deleteriously affected by water nor injured by weight supported thereon. A buffer cloth 125 covers the resilient material 124 and extends down over the sides of frame member 123 to protect the material 124 and further bind it to frame 123. A pair of double angled bars 126 form a yoke or mounting bracket which is secured to the frame member 123 of pad 122 as by a nut and bolt 128. Bracket 126 is tiltably mounted, by a nut and bolt 129, to a support post 130 which is slidably received in guide bores 131 through legs 14 of each longitudinal frame member 12 and 13. Bores 131 in each member 12 and 13 are registrably disposed to position post 130 in juxtaposition with the web 20. A bore 132 in each web 20 is adapted to receive a bolt 133 which can be selectively inserted through any one of a series of bores 134 on post 130 and tightened by nut 135 to adjust the vertical elevation of pad 122 in accordance with the particular boat being transported.

In the alternative embodiment shown in FIG. 13 a bunker pad 122 is tiltably mounted, as described supra, on a post 136 which is similarly slidably receivable through any of the series of registered pairs of guide holes 138 provided in opposed legs 139 of channel-like rear cross rail 21a to position post 136 in juxtaposition with the web 140 thereof. A bore 141 is provided in web 140 for each pair of guide holes 138. Each bore 141 is adapted to receive a bolt 142 which can be selectively inserted through any one of a series of bores 143 in post 136 and tightened by a nut (not shown). This embodiment permits dual adjustment—i.e., both vertical and lateral—of post 136 in accordance with the shape of the hull of the particular boat being transported.

Referring again to FIG. 1, the trailer 10 is provided with oppositely disposed keel chock pads 144 disposed transversely of the longitudinal axis of the trailer and rockably mounted on posts 145 receivable and vertically adjustable in guide holes 146 through cross rail 24. This positions the chock pads 144 rearwardly of pickup roller 45 on tipper boom 34 and forwardly of keel roller 54 for a purpose more fully hereinafter described in conjunction with the description of the loading and unloading operations.

The complete trailer 10 is also provided with a pair of tie-down straps 148 which are adapted to hold the boat firmly on the trailer during transportation, as by tightening the straps 148 across the boat, a buckle or other suitable means not shown.

A walkboard 149 is secured, as by bolts 150 attaching it to cross rails 22 and 23, longitudinally of the trailer adjacent frame member 12 to provide a platform along which a person can move, as may be required to facilitate loading or unloading.

Loading of the trailer 10 is preferably accomplished while it is secured to the towing vehicle by coupling 18. The trailer 10 is positioned in the loading area with the rear of the trailer facing the bow of the boat. The lock pin 40 is withdrawn from the bores 41 and 42 in hinge plates 18 and 19, permitting the frame 11 to rotate clockwise (as shown in FIGS. 1, 3 and 4) about axle 23 thereby lowering the rear end. The handle 108 is moved to position roller 56 at its highest or 56a position and a line operated by a winch 50 is attached to the forward portion of the boat. The keel of the boat is properly positioned on keel roller 56a and the winch 50 is operated to draw the boat onto the trailer. As the boat is drawn onto the trailer, the keel progressively spans all three keel rollers 54—56 which bear the weight of the boat. The cradle pads 122, although they assist in balancing the boat and thereby prevent it from tipping sideways, do not support the weight of the boat while it is being loaded.

Continued movement of the boat further onto the trailer after the forward or bow portion of the keel contacts roller 45 causes the front of the boat to ride upwardly on roller 45 which effects a downward thrust against roller 45. Properly locating suspension arms 25 along the longitudinal axis of the trailer positions the combined centers of gravity of the trailer 10 and the boat to permit the downwardly directed thrust on roller 45 to effect a leveling of the tipper boom 36 with respect to the frame 11. Preferably slight downward pressure by the operator against the hinged joint between the boom 36 and the frame 11 permits insertion of locking pin 40 through bores 41 and 42 of hinge plates 18 and 19. As the frame 11 and the boom 36 become coplanar the pickup roller 45 becomes disengaged from the keel of the boat, thus transferring the weight of the bow section onto the keel chock pads 144. It must be noted that the keel rollers 54 and 55 are preferably positioned in a lower plane than that defined by the rear keel roller 56 and chock pads 144, or, if the keel of the boat curves below that plane, sufficiently lower so that the entire weight, at this stage of the loading operation, is supported between pads 144 and roller 56 in poosition 56a. The proper vertical disposition of the rollers is best determined by adjusting the vertical position of each roller supporting bracket by its lock bolt 74 with the boat loaded on the trailer.

The winch 50 is then locked and the handle 108 is rotated to lower keel roller 56 on gudgeon 92 from its raised 56a position. This transfers the weight of the boat supported by roller 56 onto cradle pads 122. The longitudinal disposition of the pads 122 permits the pressure exerted thereby against the hull to be distributed among a suitable number of the hull ribs and other of the internal hull bracings. Furthermore, the tiltable mounting of pads 122, and rockable mounting of chocks 144, allows them to adapt to a variety of hull shapes.

In this non-roller supported, or transport position, the tie-down straps 148 are secured over the boat and the boat is ready to be transported.

To unload the boat substantially the reverse procedure is followed. The tie-down straps 148 are unfastened, and handle 108 is rotated to raise roller 56 to position 56a against the boat keel and thereby lift the rear of the boat off the cradle pads 122. The lock pin 40 is then withdrawn from bores 41 and 42 in hinge plates 18 and 19 and the winch 50 is unlocked. Slight upward pressure against the hinge connection between the frame 11 and the tipper boom 36 causes the pickup roller 45 to engage the boat keel and urge the hull off the chocks 144. This simultaneously tips the frame 11, lowering the rear end. Gravity then urges the boat rearwardly with the boat resting on keel rollers 54–56. As the winch 50 pays out the line attached to the forward portion of the boat, gravity continues to urge the boat rearwardly on the keel rollers until the boat is unloaded from the trailer.

A trailer according to the present invention thus affords a simplified method of loading and unloading a boat and insures adequate protection to the hull in transit.

What is claimed is:

1. A boat trailer comprising, a frame having longitudinal side members and lateral stiffening members extending between said side members, a running gear assembly depending beneath said frame, a tipper boom aligned with the longitudinal axis of said trailer and pivotally mounted between the front ends of said side members, said tipper boom being selectively positionable coplanar with said frame, means for cooperatively engaging said tipper boom selectively to maintain said coplanar position, a pickup roller on the rear portion of said tipper boom, tow vehicle coupling means on the front end of said tipper boom, a plurality of transverse anti-friction keel engaging means spaced along the longitudinal axis of said trailer and between its ends, laterally spaced boat-supporting cradle pads, anti-friction keel engaging means at the rear of said frame, and means selectively to change the relative elevation of said rear keel engaging means with respect to said pads.

2. A boat trailer comprising, a frame having longitudinal side members and lateral stiffening members extending between said side members, a running gear assembly depending beneath said frame, opposed hinge plates at the forward end of each said frame members, a tipper boom aligned with the longitudinal axis of said trailer and pivotally mounted between said opposed hinge plates, said tipper boom being selectively positionable coplanar with said frame, the fixed stop plate extending between said hinge plates rearwardly of said pivotal mounting, removable locking means forwardly of said pivotal mounting cooperatively engaging the under portion of said tipper boom to maintain said coplanar position, a pickup roller on the rear portion of said tipper boom, tow vehicle coupling means on the front end of said tipper boom, a plurality of transverse anti-friction keel engaging means spaced along the longitudinal axis of said trailer and between its ends, laterally spaced boat-supporting cradle pads, anti-friction keel engaging means at the rear of said frame, and means selectively to change the relative elevation of said rear keel engaging means with respect to said pads.

3. A boat trailer comprising, a frame having longitudinal side members and lateral stiffening members extending between said side members, a running gear assembly depending beneath said frame, a tipper boom aligned with the longitudinal axis of said trailer and pivotally mounted between the front ends of said side members, said tipper boom being selectively positionable coplanar with said frame, means for cooperatively engaging said tipper boom selectively to maintain said coplanar position, a pickup roller on the rear portion of said tipper boom, tow vehicle coupling means on the front end of said tipper boom, a plurality of mounting brackets spaced along the longitudinal axis of said trailer including one said bracket at the rear end of said trailer, an anti-friction keel engaging means rotatably mounted on each of said brackets, means precisely to adjust and lock the vertical disposition of said brackets with respect to said trailer frame, laterally spaced boat-supporting cradle pads, and independent means selectively to change the relative elevation of said rear keel engaging means with respect to said pads.

4. A boat trailer comprising, a frame having longitudinal side members and lateral stiffening members extending between said side members, including a cross rail extending between the rear ends of said longitudinal side members, a running gear assembly depending beneath said frame, a tipper boom aligned with the longitudinal axis of said trailer and pivotally mounted between the front ends of said side members, said tipper boom being selectively positionable coplanar with said frame, means for cooperatively engaging said tipper boom selectively to maintain said coplanar position, a pickup roller on the rear end of said tipper boom, tow vehicle coupling means on the front end of said tipper boom, transverse keel rollers spaced along the longitudinal axis of said trailer, opposed rockable chock pads supported by said frame on either side of and transversely to the longitudinal axis of said trailer between said pickup roller and the foremost of said keel rollers, a rear keel roller mounted on said rear cross rail and adapted to be bodily raised and lowered, opposed tiltable cradle pads parallel to the longitudinal axis of said trailer and spaced laterally of said rear keel roller and means to lower and raise said keel roller selectively to position a boat in and out of contact with said cradle pads.

5. A boat trailer comprising, a frame having longitudinal side members and lateral stiffening members extending between said side members and including a cross rail extending between the rear ends of said longitudinal side members, a running gear assembly depending beneath said frame, a tipper boom aligned with the longitudinal axis of said trailer and pivotally mounted between the front ends of said side members, said tipper boom being selectively positionable coplanar with said frame, means for cooperatively engaging said tipper boom selectively to maintain said coplanar position, a pickup roller on the rear end of said tipper boom, tow vehicle coupling means on the front end of said tipper boom, vertically adjustable transverse keel rollers spaced along the longitudinal axis of said trailer, opposed vertically adjustable rockable chock pads supported by said frame on either side of and transversely to the longitudinal axis of said trailer between said pickup roller and the foremost of said keel rollers, a vertically adjustable bracket mounted on said rear cross rail, a gudgeon pivotally mounted on said bracket, a rear keel roller journaled in said gudgeon, said roller being bodily raised and lowered by pivoting said gudgeon, opposed vertically adjustable tiltable cradle pads parallel to the longitudinal axis of said trailer and spaced laterally of said rear keel roller, and means operable from outside the frame of said trailer to pivotally move said gudgeon.

6. A boat trailer comprising, a frame having longitudinal side members and lateral stiffening members extending between said side members, including a rear cross rail extending between the rear ends of said longitudinal side members, a running gear assembly depending beneath said frame, a tipper boom aligned with the longitudinal axis of said trailer and pivotally mounted between the front ends of said side members, said tipper boom being selectively positionable coplanar with said frame, a fixed stop plate attached to said frame rearwardly of said pivotable mounting and a locking means forwardly of said pivotal mounting cooperatively engaging the under portion of said tipper boom selectively to maintain said coplanar position, a pickup roller on the rear end of said tipper boom, tow vehicle coupling means on the front end of said tipper boom, transverse keel rollers spaced along the longitudinal axis of said trailer, opposed rockable chock pads supported by said frame on either side of and transversely to the longitudinal axis of said trailer between said pickup roller and the foremost of said keel rollers, a rear keel roller mounted on said rear cross rail and adapted to be bodily raised and lowered, opposed tiltable cradle pads parallel to the longitudinal axis of said trailer and spaced laterally of said rear keel roller, and means to lower and raise said rear keel roller selectively to position a boat in and out of contact with said cradle pads.

7. A boat trailer comprising, a frame having longitudinal side members and lateral stiffening members extending between said side members including a cross rail extending between the rear ends of said longitudinal side members, a hinge plate at the forward end of each frame side member, the hinge plate on each frame member being opposed to and spaced apart from the hinge plate on said opposite side members, a running gear assembly depending beneath said frame, a tipper boom aligned with the longitudinal axis of said trailer and pivotally mounted between hinge plates, said tipper boom being selectively positionable coplanar with said frame, a fixed stop plate attached between said hinge plates rearwardly of said pivotal mounting and a locking means forwardly of said pivotal mounting cooperatively engaging the under portion of said tipper boom selectively to maintain said coplanar position, a pickup roller on the rear end of said tipper boom, tow vehicle coupling means on the front end of said tipper boom, a winch means on said tipper boom intermediate the ends thereof and a bow support pad rearwardly thereof, transverse vertically adjustable keel rollers spaced along the longitudinal axis of said trailer, opposed vertically adjustable rockable chock pads supported by said frame on either side of and transversely to the longitudinal axis of said trailer between said pickup roller and the foremost of said keel rollers, a vertically adjustable bracket mounted on said rear cross rail, a gudgeon pivotally mounted on said bracket, a rear keel roller journaled in said gudgeon, said roller being bodily raised and lowered by pivoting said gudgeon, opposed vertically adjustable tiltable cradle pads parallel to the longitudinal axis of said trailer and spaced laterally of said rear keel roller, and manual means adapted selectively to pivot said gudgeon from outside said frame.

References Cited in the file of this patent

UNITED STATES PATENTS

| | | |
|---|---|---|
| 2,628,733 | Hale | Feb. 17, 1953 |
| 2,746,622 | Roy | May 22, 1956 |
| 2,788,146 | Gronlund | Apr. 9, 1957 |
| 2,789,713 | Agricola | Apr. 23, 1957 |
| 2,805,786 | Green | Sept. 10, 1957 |
| 2,865,522 | Peterson | Dec. 23, 1958 |
| 2,887,238 | Huber | May 19, 1959 |
| 2,907,484 | Parker | Oct. 6, 1959 |
| 2,960,246 | Lovelace | Nov. 15, 1960 |
| 2,975,916 | Steber | Mar. 21, 1961 |
| 3,069,038 | Ahlbin | Dec. 18, 1962 |
| 3,077,276 | Thwreatt | Feb. 12, 1963 |